May 22, 1928.  
E. TIMBS  
1,670,600  
TWO-PIECE DRUM FOR ROTARY DRAW WORKS  
Filed May 25, 1927
Fig. 1.
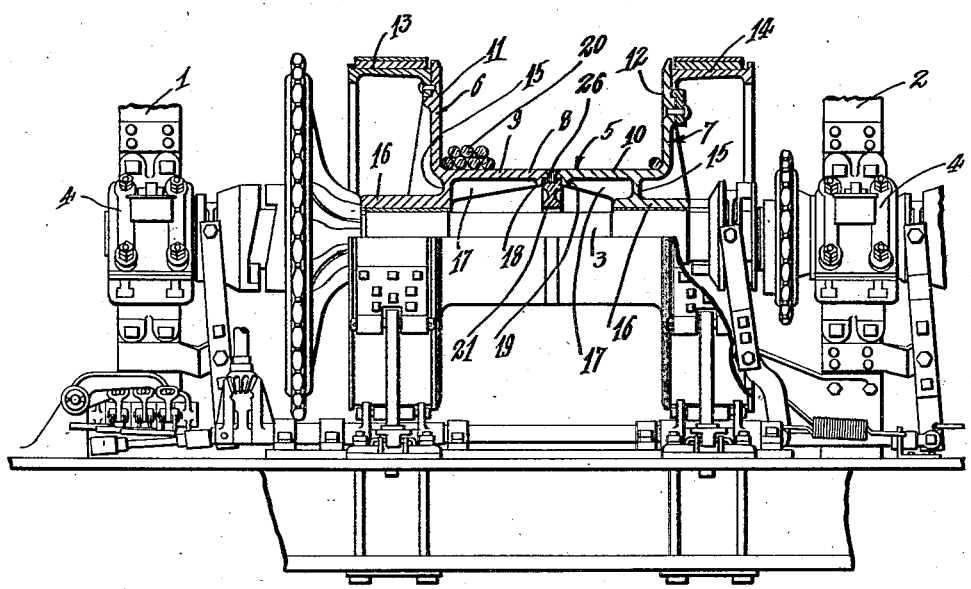
Fig. 2.
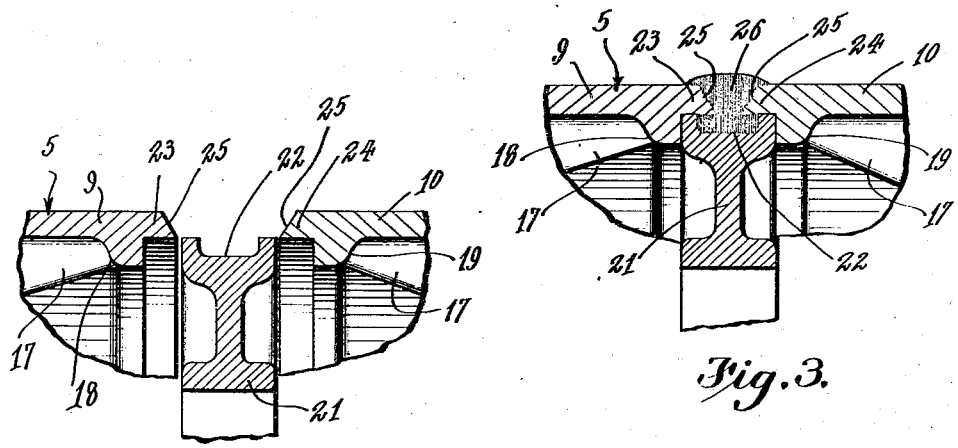
Fig. 3.
Inventor  
Edward Timbs  
By Lyon & Lyon  
Attorneys Patented May 22, 1928.

1,670,600

UNITED STATES PATENT OFFICE.

EDWARD TIMBS, OF LOS ANGELES, CALIFORNIA, ASSIGNOR TO THE NATIONAL SUPPLY COMPANY OF DELAWARE, OF NEW YORK, N. Y., A CORPORATION OF DELAWARE.

TWO-PIECE DRUM FOR ROTARY DRAW WORKS.

Application filed May 25, 1927. Serial No. 194,045.

This invention relates to two-piece drums for rotary drawworks, and is more particularly related to a two-piece drum including two sections connected together at substantially the mid-section of the spool of the drum and each section including substantially one-half of the spool and being formed integral with a circumferential flange to which a brake rim is secured.

In rotary drawworks, the principal problem presented in the construction of the drum is to obtain a drum large enough to carry a length of line of several thousand feet without unnecessarily extending the length of the drum. The drum of the drawworks must be mounted between a pair of posts, the distance apart of which is regulated by the position of the rotary drawworks in relation to the rotary machine which is driven by the rotary drawworks. The rotary drawworks within which the drum construction embodying this invention is adapted for use is constructed for the drilling of oil wells, the depth of which may be in excess of 4,000 feet. As drilling methods have improved, there is required greater speed of reeling and unreeling the line by means of which the rotary drill stem and drill are supported. Time is often a very essential feature in the successful drilling of an oil well, particularly in localities where several are prospecting for oil at the same time. This time requirement is a second reason why the drum for a rotary drawworks should be large and also determines the diameter to which the spool of the drawworks should be constructed so that, without rotating the drum at an excessive speed, the line will be fed from the drum or reeled upon the drum at a rapid rate. In constructing large drums for drawworks, it is difficult if not impossible to construct the drawworks of one single portion of material. In constructing drawworks, it is preferable that the end flanges formed at the ends of the drawworks spool be formed integral with the spool so that the line, when reeled on the spool, does not tend to force the flanges outwardly away from the end of the spool, allowing the line to drop into the space formed by the forcing of the flange away from the spool so that the line catches. The line wound upon the spool of the drawworks supports great loads and it is, therefore, necessary to construct the spool of the drawworks of great strength.

It is, therefore, an object of this invention to provide a drum for rotary drawworks constructed of two substantially complementary sections, each of which includes a portion of the drawworks drum having an integral flange at its end and in which drawworks, there is provided means for connecting the portions of the spool and for reenforcing the same at the point of connection.

Another object of this invention is to provide a drum for rotary drawworks having two sections formed to include substantially one-half of the spool of the drum and having integral annular flanges at their opposed ends, and means mounted within the spool of the drawworks by means of which the half sections of the spool are connected together and braced at substantially the mid point of the drum.

Other objects and advantages of this invention, it is believed, will be apparent from the following detailed description of a preferred embodiment of the invention, as illustrated in the accompanying drawings.

In the drawings:

Figure 1 is a front elevation, partly in vertical mid-section of a rotary drawworks drum embodying this invention, illustrating the same as secured to the drum shaft and journaled in bearings secured to the posts of the rotary drawworks.

Figure 2 is a detached fragmental sectional view of the drum construction embodying this invention.

Figure 3 is a fragmental sectional view of the drawworks construction embodying this invention illustrating the fragments of the spool of the drawworks secured to the internally mounted connecting means by which the portions of the spool of the drawworks are connected together and braced at substantially the mid-point of a rotary drawworks.

In the preferred embodiment of this invention, illustrated in the accompanying drawings, 1 and 2 indicate the posts of the rotary drawworks upon which a drum shaft 3 is journaled in bearings 4. The posts 1 and 2, shaft 3, and bearings 4 may be of any suitable or desirable construction, as is well understood in the art.

The drum 5 is mounted upon the shaft 3 in any suitable or desirable manner and may be either journaled on the shaft 3 or secured to the same, depending upon the type of drive which it is desired to employ for driving the same.

The drum 5 is constructed of two complementary portions 6 and 7. Each of the portions 6 and 7 is formed to include substantially one-half of the spool 8 of the drum 5, as indicated at 9 and 10. The sections or portions 9 and 10 are formed integral with annular flanges 11 and 12 at their opposed ends. Secured to the annular flanges 11 and 12 in any suitable or desirable manner, as is well understood in the art, are brake drums 13 and 14.

Each of the portions 6 and 7 is also formed integral with an inwardly extending flange 15 which is also formed integral with an elongated hub 16. The hubs 16 support the drum upon the shaft 3. Each of the portions 6 and 7 is reenforced by means of a plurality of spaced webs 17, which extend from the inwardly extending flanges 15 and terminate at annular shoulders 18 and 19 formed near the adjacent ends of the spool portions 9 and 10 of the drum. The reenforcing webs 17 are for the purpose of preventing the spool from collapsing when the line 20 is wound thereon.

Means are provided for connecting the spool portions 8 and 9 at substantially the mid-section of the drum, which means also include reenforcing means for reenforcing the spool of the drum at the mid-portion thereof and are preferably of the following construction:

Mounted intermediate the shoulders 18 and 19 is a ring 21. The ring 21 is preferably a casting formed to have a cross-section similar to an I-beam or the like. Formed around the periphery of the ring 21 is a groove 22. The ends 23 and 24 of the spool portions 8 and 9 project beyond the shoulders 18 and 19, and are beveled inwardly, as indicated at 25, to provide a welding channel over the peripheral groove 22.

In assembling the sections 6 and 7 of the drum, the ring 21 is mounted adjacent one of the shoulders 18 or 19 and the other section of the drawworks is then slid over the ring 21. The welding channel and peripheral groove are then filled with metal by welding, as indicated in Figure 3 at 26. After the welding channel and groove 22 have been filled by welding metal into the same so as to secure each of the spool portions 9 and 10 to the ring 21, the periphery of the spool is then turned to cut away the excess welding material and finish the surface of the spool of the drum.

Having fully described my invention, it is to be understood that I do not wish to be limited to the details herein set forth, but my invention is of the scope of the appended claims.

I claim:

1. A large drum for rotary drawworks, including two sections which when connected are united at substantially the mid-section of the drawworks spool, each section including substantially one-half of the spool and being formed integral with a circumferentially extending flange, and means for securing the sections together.

2. A large drum for rotary drawworks having two sections formed to include substantially one-half of the spool of the drum and having integral annular flanges at their opposed ends, and means for securing the sections together, and for bracing the same at the mid-section of the spool.

3. A large drum for rotary drawworks having two sections formed to include substantially one-half of the drum spool, integral flanges at their opposed ends, and hubs adapted to fit closely the drum shaft, and a ring within and welded to the adjacent ends of the two sections.

4. A large drum for rotary drawworks having two sections formed to include portions of the drum spool, the ends of the spool being provided with inwardly projecting annular shoulders, and a ring mounted within the drum intermediate the shoulders and welded to the ends of the spool portions.

5. A device of the class described comprising a pair of sections including portions of the spool of the drum for a rotary drawworks, the adjacent ends of the spool portions being adapted to be contacted at substantially the mid-section of the drum, annular shoulders formed on the interior of the spool portions, a ring mounted within the spool portions intermediate the annular shoulders and having a circumferential peripheral groove, and the ends of the spool portions being welded to the ring in the groove.

6. A rotary drawworks drum having a pair of complementary spool portions, the ends of the spool portions being tapered outwardly to form a tapered welding channel, and a reenforcing and connecting ring mounted within the drum and welded thereto through the tapered welding channel.

7. A rotary drawworks drum having a pair of complementary spool portions, the ends of the spool portions being tapered outwardly to form an annular tapered welding channel, and a reenforcing and connecting ring mounted within the drum and welded thereto in a circumferential peripheral groove formed in the ring through the said welding channel.

8. A rotary drawworks drum having a pair of complementary spool portions, the ends of the spool portions being tapered outwardly to form a tapered welding channel, annular shoulders formed adjacent the ends of the spool portions, and a reenforcing and connecting ring mounted within the drum and welded thereto through the tapered welding channel.

9. A rotary drawworks drum having a pair of complementary spool portions, the ends of the spool portions being tapered outwardly to form an annular tapered welding channel, annular shoulders formed adjacent the ends of the spool portions, and a reenforcing and connecting ring mounted within the drum and welded thereto in a peripheral groove formed in the ring through the said welding channel.

10. A rotary drawworks drum having a pair of complementary spool portions, the ends of the spool portions being tapered outwardly to form a tapered welding channel, and a reenforcing and connecting I-beam ring mounted within the drum and welded thereto through the tapered welding channel.

11. A rotary drawworks drum having a pair of complementary spool portions, the ends of the spool portions being tapered outwardly to form a tapered welding channel, annular shoulders formed adjacent the ends of the spool portions, and a reenforcing and connecting drum ring mounted within the drum and welded thereto through the tapered welding channel.

12. A rotary drawworks drum having a pair of complementary spool portions, the end of the spool portions being tapered outwardly to form a tapered welding channel, the spool portions being formed integral with supporting hubs by means of which the drum is mounted upon a shaft, and a reenforcing and connecting ring mounted within the drum and having a peripheral groove, the spool portions being welded to the ring by welding metal through the welding channel into the peripheral groove.

13. A rotary drawworks drum having a pair of complementary spool portions having integral flanges at their opposed ends, the adjacent ends of the spool portions being tapered outwardly to form a tapered welding channel, and a reenforcing and connecting ring mounted within the drum and welded thereto through the tapered welding channel.

14. A rotary drawworks drum having a pair of complementary spool portions, the spool portions being formed integral with annular flanges at their opposed ends, brake rims secured to the annular flanges, and a reenforcing and connecting ring mounted within and welded to the spool portions at their adjacent ends.

Signed at Torrance, this 18th day of May 1927.

EDWARD TIMBS.